Jan. 10, 1956   E. ROGERS ET AL   2,730,374
POWER MOWER WITH WHEEL RAISING AND LOWERING MEANS
Filed Aug. 31, 1953   2 Sheets-Sheet 1
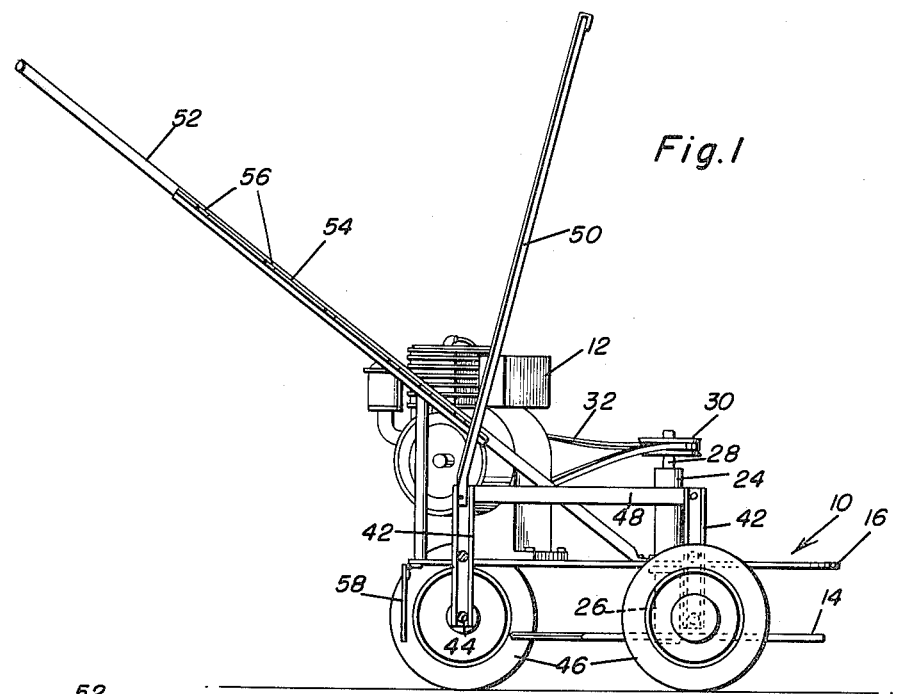
Fig.1
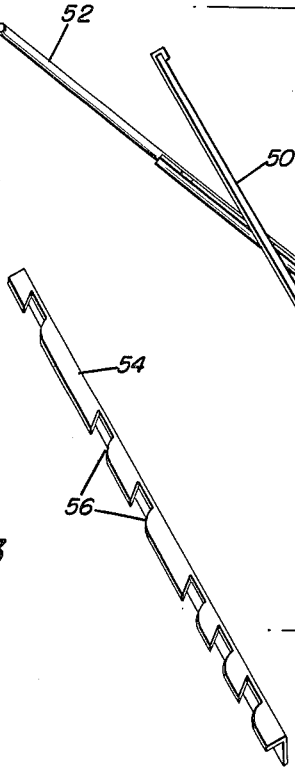
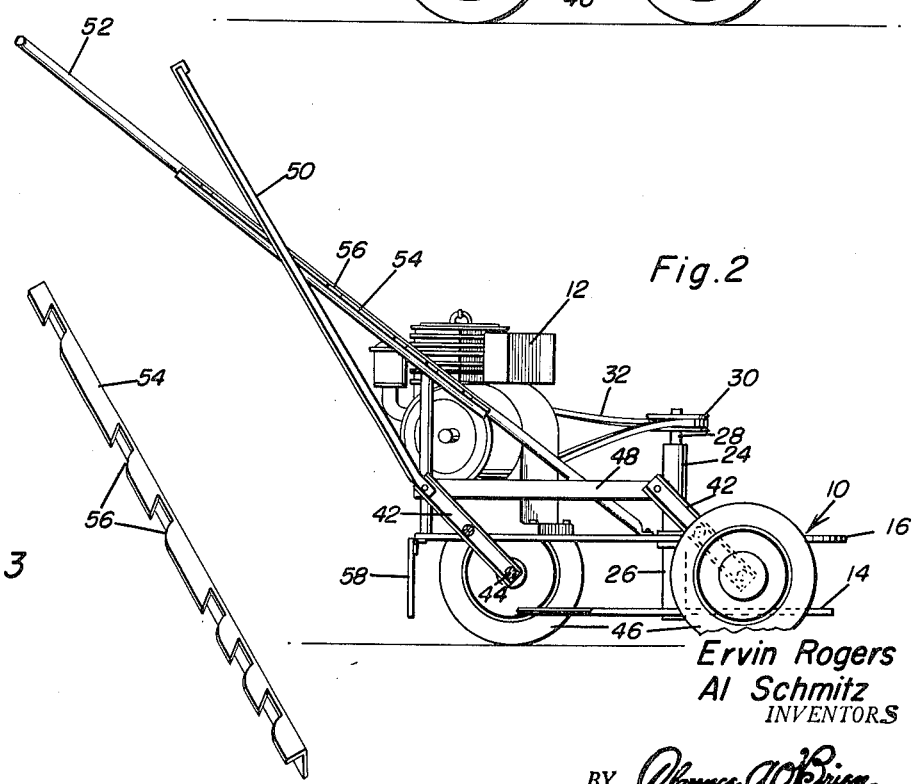
Fig.2
Fig.3
Ervin Rogers
Al Schmitz
INVENTORS
BY *Clarence A. O'Brien*
*and Harvey B. Jackson*
Attorneys Jan. 10, 1956   E. ROGERS ET AL   2,730,374
POWER MOWER WITH WHEEL RAISING AND LOWERING MEANS
Filed Aug. 31, 1953   2 Sheets-Sheet 2
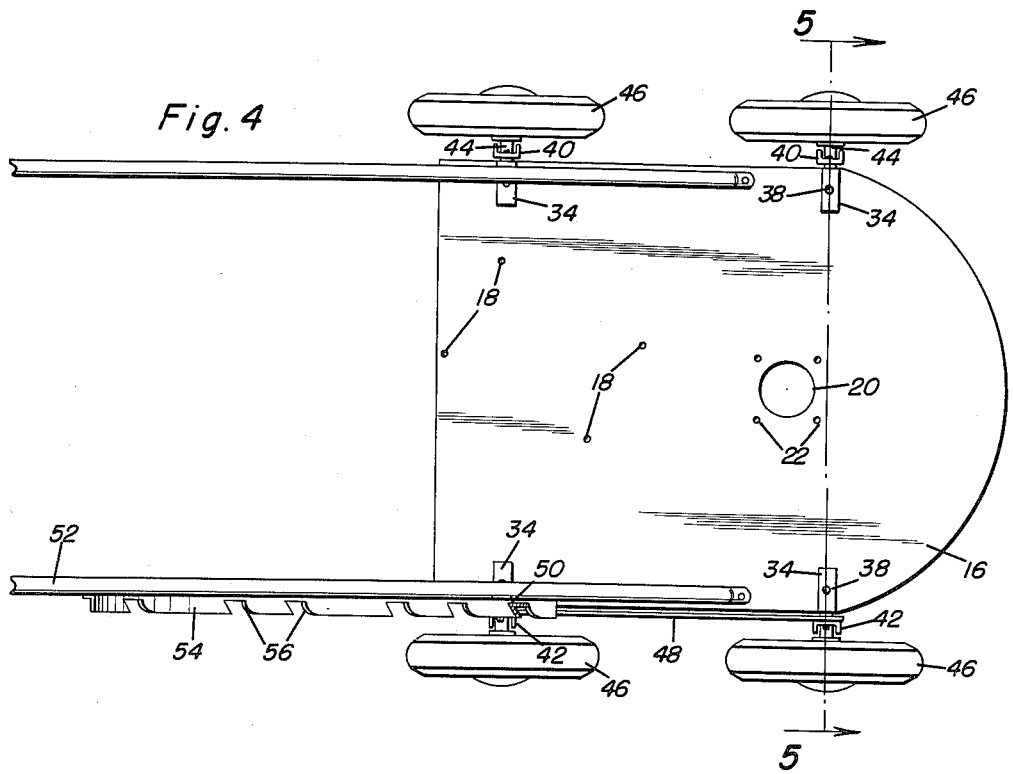
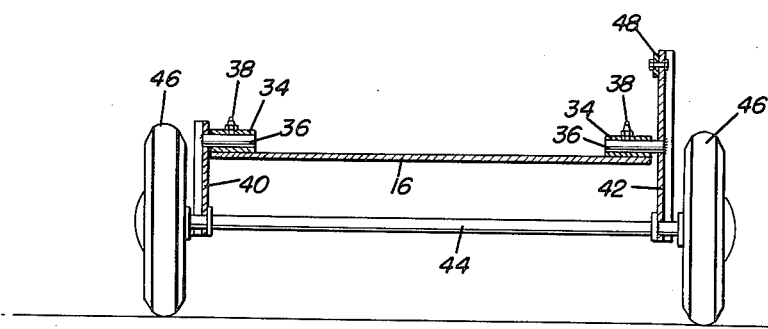
Ervin Rogers
Al Schmitz
INVENTORS.

2,730,374

POWER MOWER WITH WHEEL RAISING AND LOWERING MEANS

Ervin Rogers and Al Schmitz, Nebraska City, Nebr.

Application August 31, 1953, Serial No. 377,623

1 Claim. (Cl. 280—44)

This invention relates to power mowers and more particularly to a power mower having a vertically adjustable base member with a motor and cutter blade mounted thereon, in which the height of the cut made by the cutter blade is varied by adjusting the vertical position of the base member.

An object of the present invention is to provide a power mower having a vertically adjustable base member which base member can be adjusted at varying positions between upper and lower limits.

Another object of the present invention is to provide a power mower having an adjustable base member wherein the height of the cut is adjustable while the mower is moving.

A further object of the present invention is to provide a power mower having an adjustable base member wherein no extra tools are needed to adjust the vertical position of the base member.

A still further object of the present invention is to provide a power mower having an adjustable base member having an improved adjusting means which is simple and efficient in operation.

A yet further object of the present invention is to provide a power mower having an adjustable base member which is sturdy in construction and durable and lasting in use.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a side elevational view of the preferred form of the present invention showing the base member in its uppermost position, and having one rear wheel removed to show the position of the adjusting means;

Figure 2 is a side elevational view of the preferred form of the present invention showing the base member in a lowered position, and having one rear wheel removed showing the position of the adjusting members;

Figure 3 is a perspective view of the retaining means for the control handle which adjusts the position of the base member;

Figure 4 is a top view of the preferred form of the present invention with the motor and cutter blade removed; and Figure 5 is a sectional view taken substantially along the section line 5—5 of Figure 4.

Referring now more specifically to the accompanying drawings, it will be seen that the improved power mower forming the subject of this invention includes, as shown in Figure 1, a vertically adjustable base member 10 having a motor 12 and a cutter blade 14 mounted thereon.

The base 10 is formed by a flat horizontally disposed plate 16 having a rounded front edge. The plate 16 is provided with holes 18 adjacent the rear thereof for mounting the motor 12 thereon. The plate 16 is also provided with a large aperture 20 spaced from the rounded edge thereof, and a plurality of holes 22 spaced around the aperture 20. A tubular bushing 24 having an outwardly extending flange at the lower end thereof is secured to the upper surface of the plate 16 and a tubular bushing 26 having an outwardly extending flange is secured to the bottom surface of the plate 16. The central openings in the bushings 24 and 26 are aligned with the aperture 20 in the plate 16, and the outwardly extending flanges on the bushings 24 and 26 have holes therein registering with the holes 22 in the plate 16 through which bolts are inserted to secure the bushings in place. A shaft 28 extends through the central openings in the bushings 24 and 26 and through the aperture 20 in the plate 16. The cutter blade 14 is secured to the lower end of the shaft 28. The upper end of the shaft 28 is provided with a pulley 30 having a belt 32 entrained therearound, which belt is also entrained around the drive shaft of the motor 12. Thus, when the motor is in operation the cutter blade 14 will be driven by the belt, pulley, and shaft. The aperture 20 is spaced from the rounded edge of the plate 16 a distance such that the cutter blade 14 will not extend beyond the front edge of the plate 16.

Bushings 34 are mounted on the upper surface of plate 16 adjacent the front and rear portions and on each side thereof. The bushings 34 are perpendicular to the sides of plate member 16 and have stub shafts 36 rotatably mounted therein, each of the stub shafts extending beyond the sides of the plate 16. The bushings 34 are provided with suitable fittings 38 for lubricating the shafts 36.

Each of the stub shafts 36 on one side of the plate 16 is provided with an arm fixedly secured at one end to the outer end of the stub shaft. The arms 40 extend downwardly from the shafts 36. Each of the stub shafts 36 on the other side of the plate 16 is provided with an arm 42 which is substantially twice as long as the arms 40. The arms 42 are secured at the mid points thereof to the outer ends of shafts 36 and have one portion extending downwardly from the shafts 36 and another portion extending upwardly from the shafts 36. The downwardly extending portion of the arms 42 is of the same length as the downwardly extending portion of arms 40, and is adapted to be axially aligned with the arm 40.

An axle 44 extends between the lower ends of arms 40 and 42 at each end of the plate 16. The axles 44 have the ends thereof extending through the arms 40 and 42 and wheels 46 are mounted on the opposite ends of the axles 44 outwardly of arms 40 and 42. The bushing 26 on the lower surface of plate 16 is of such a length that the cutter blade 14 will always be disposed below the axle 44.

A rod 48 is pivotally secured at its opposite ends to the upper ends of arms 42 on one side of the plate 16. A lever arm 50 is secured to the upper end of the rear arm 42 in fixed position. Movement of the lever arm in a forward direction will cause the arms 42 to pivot about the shaft 36 thereby moving the wheels 46 away from the plate 16 and causing elevation of the plate 16. Rearward movement of the handle 50 will cause pivotal movement of the arms 42 about the shafts 36 and move the wheels 46 toward the plate 16 thereby lowering the plate 16.

A handle 52 is secured to the plate 16 and extends rearwardly thereof. The handle 52 has mounted a bar member 54 having a series of notches 56 therein. The member 54 is mounted on the handle 52 on the side adjacent the side of plate 16 having arms 42 mounted thereon. The lever 50 is adapted to engage in the notches 56 to retain the lever and in consequence thereof the wheels 46 in adjusted position. When it is desired to change the elevation of the base 10, the lever 50 is merely released from the notches 56 and then moved to the desired position and allowed to come in contact with another notch 56 which corresponds to the desired position.

The rear edge of plate 16 is provided with a downwardly extending plate 58 hingedly secured thereto, which plate serves as a deflector for the cut material. This plate serves to prevent the material from flying back against the operator when the power mower is in operation.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

In a power mower, a base adapted to support a motor and cutter blade thereon, a pair of bushings mounted on the upper surface of said base member along each side thereof, a shaft rotatably mounted in each of said bushings, an upright axle supporting member secured to an end of each shaft, and control means connected to said axle supporting members for adjusting the position of said axles with respect to the base member, said axle supporting members comprising a first pair of arms secured at one end to the shafts on one side of the base member and extending downwardly therefrom, a second pair of arms secured adjacent their mid points to the shafts on the other side of the base member, the second pair of arms being substantially twice the length of the first pair of arms and having a downwardly extending portion equal to the downwardly extending first pair of arms and an upwardly extending portion, said downwardly extending portions being axially aligned with the second pair of arms on the other side of the base member to form aligned pairs of arms, said control means being connected to the upper portion of said second pair of arms, an axle connected between each axially aligned pair of arms adjacent the lower end thereof, and a wheel rotatably supported on each end of the axles, said control means comprising a rod pivotally connected between the upper ends of said second pair of arms, an upright actuating lever connected to one of said second pair of arms, a handle inclining upwardly from said base member and across said lever, and a bar extending along said handle on the same side of the base member as said second pair of arms and provided with notches spaced along the same for selective engagement with said actuating lever for securing the lever in various adjusted positions.

References Cited in the file of this patent

UNITED STATES PATENTS

| | | |
|---|---|---|
| 979,093 | Porteus | Dec. 20, 1910 |
| 1,154,370 | Burke | Sept. 21, 1915 |
| 2,557,598 | Daggett | June 19, 1951 |
| 2,568,822 | Pervis | Sept. 25, 1951 |

FOREIGN PATENTS

| | | |
|---|---|---|
| 827,158 | Germany | Jan. 7, 1952 |